US012665380B2

(12) United States Patent
Davila-Rodriguez et al.

(10) Patent No.: US 12,665,380 B2
(45) Date of Patent: Jun. 23, 2026

(54) LASER FREQUENCY STABILIZATION

(71) Applicant: Stable Laser Systems, Inc., Boulder, CO (US)

(72) Inventors: Josue Davila-Rodriguez, Boulder, CO (US); William David Lee, Boulder, CO (US); Mark Notcutt, Boulder, CO (US)

(73) Assignee: Stable Laser Systems, Inc., Boulder, CO (US)

( * ) Notice: Subject to any disclaimer, the term of this patent is extended or adjusted under 35 U.S.C. 154(b) by 683 days.

(21) Appl. No.: 18/163,458

(22) Filed: Feb. 2, 2023

(65) Prior Publication Data

US 2023/0253753 A1 Aug. 10, 2023

Related U.S. Application Data

(60) Provisional application No. 63/306,903, filed on Feb. 4, 2022.

(51) Int. Cl.
*H01S 3/137* (2006.01)
*H01S 3/13* (2006.01)

(52) U.S. Cl.
CPC ............ *H01S 3/1305* (2013.01); *H01S 3/137* (2013.01)

(58) Field of Classification Search
CPC ...... H01S 3/1305; H01S 3/137; H01S 3/1304; H01S 3/1303; H01S 3/0085; H01S 3/1307
See application file for complete search history.

(56) References Cited

U.S. PATENT DOCUMENTS 8,331,409 B1 * 12/2012 Liang .................... H01S 3/1303 372/29.016
10,141,712 B1 11/2018 Notcutt et al.
2007/0030176 A1 * 2/2007 Sanchez-Olea ....... H01S 5/0014 341/13
2009/0231170 A1 * 9/2009 Jung .................... H04B 1/0003 341/100
2011/0284507 A1 * 11/2011 Deladurantaye .... H01S 5/06835 219/121.61
2014/0044142 A1 2/2014 Strandjord et al.

(Continued)

OTHER PUBLICATIONS

International Search Report and Written Opinion, dated Jul. 27, 2023, corresponding to International Application No. PCT/US2023/061819, (from which the present application claims priority,) 17 pp.

(Continued)

*Primary Examiner* — Xinning(Tom) Niu
(74) *Attorney, Agent, or Firm* — LEYDIG VOIT & MAYER, LTD.

(57) ABSTRACT

A laser stabilization system and method are provided. The laser stabilization system includes: a laser configured to produce a laser light signal at a target frequency; a phase modulator configured to apply a phase modulation to the laser light signal to produce a phase modulated laser light signal; a stable optical resonator configured to receive the phase modulated laser light signal and return a light signal; a light detection system configured to receive the light signal from the stable optical resonator and produce an amplitude modulated electrical signal based on the light signal; and a digital domain circuit configured to generate a control signal based on the amplitude modulated electrical signal.

14 Claims, 7 Drawing Sheets

(56) References Cited

U.S. PATENT DOCUMENTS

| | | | | |
|---|---|---|---|---|
| 2014/0070072 A1* | 3/2014 | Kuo | .......................... | G01J 9/04 250/201.1 |
| 2016/0003619 A1 | 1/2016 | Strandjord et al. | | |
| 2016/0254866 A1 | 9/2016 | Blumenthal et al. | | |
| 2020/0014167 A1* | 1/2020 | Rolland | ................ | H01S 3/1307 |

OTHER PUBLICATIONS

Stable Laser Systems (Apr. 2021) "Fiber Noise Cancelation System: FNCS-1000-1," Accessed at least as early as Apr. 30, 2021. https://stablelasers.com/products/fiber-noise-cancelation-system/.
Stable Laser Systems (Apr. 2021) "Fiber Noise Cancelation System: FNCS-1000-1," Spec Sheet, Accessed at least as early as Apr. 30, 2021. https://stablelasers.com/wp-content/uploads/2017/11/FiberNoiseCancelation_SpecSheet.pdf.
Thorpe et al. (2008) "Laser frequency stabilization and control through offset sideband locking to optical cavities," Opt. Express 16, 15980-15990.
Wikipedia Contributors, "Pound-Drever-Hall technique"Accessed at least as early as Apr. 30, 2021. https://en.wikipedia.org/wiki/Pound%E2%80%93Drever%E2%80%93Hall_technique.
Extended European Search Report issued EP app. 23750379.2, dated Jan. 16, 2026.
Xing et al. (Jan. 2013) "Design of digital Pound-Drever-Hall frequency stabilizing system for two-cavity dual-frequency Nd:YAG laser", Proceedings vol. 8759, Eighth International Symposium on Precision Engineering Measurement and Instrumentation doi.org/10.1117/12.2015216.

* cited by examiner

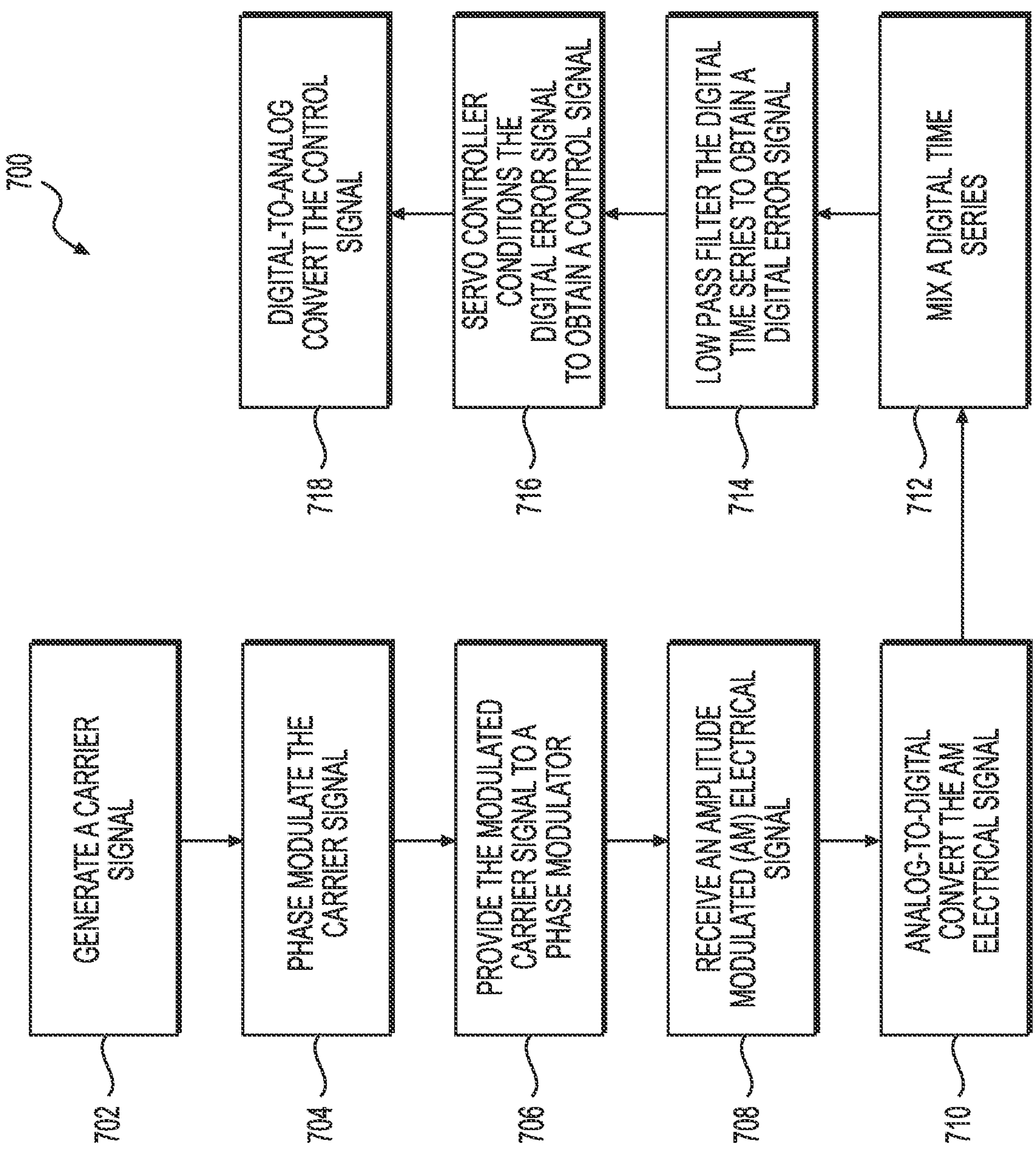

702 — GENERATE A CARRIER SIGNAL

704 — PHASE MODULATE THE CARRIER SIGNAL

706 — PROVIDE THE MODULATED CARRIER SIGNAL TO A PHASE MODULATOR

708 — RECEIVE AN AMPLITUDE MODULATED (AM) ELECTRICAL SIGNAL

710 — ANALOG-TO-DIGITAL CONVERT THE AM ELECTRICAL SIGNAL

712 — MIX A DIGITAL TIME SERIES

714 — LOW PASS FILTER THE DIGITAL TIME SERIES TO OBTAIN A DIGITAL ERROR SIGNAL

716 — SERVO CONTROLLER CONDITIONS THE DIGITAL ERROR SIGNAL TO OBTAIN A CONTROL SIGNAL

718 — DIGITAL-TO-ANALOG CONVERT THE CONTROL SIGNAL

LASER FREQUENCY STABILIZATION

CROSS-REFERENCE TO RELATED APPLICATIONS

This application claims the benefit of and priority to U.S. Provisional Patent Application No. 63/306,903, filed Feb. 4, 2022 which is hereby incorporated by reference in its entirety.

BACKGROUND

The free-running optical frequency stability of a typical laser is insufficient for many applications, such as optical atomic clocks, quantum computers, precision spectroscopy, optical frequency comb stabilization, and coherent optical communications. Accordingly, frequency stabilization of a laser is an important factor for these and other high-precision laser applications. Typically, to achieve the required stability of the output frequency of the laser, active frequency stabilization is performed. One such technique for active frequency stabilization entails locking the laser to a high quality optical resonator, typically using the Pound-Drever-Hall (PDH) technique. Using the PDH technique, the frequency of a laser can be locked to a longitudinal mode of an optical resonator (e.g., a Fabry-Pérot cavity) for the purpose of frequency stabilization.

FIG. 1 illustrates a PDH laser frequency stabilization system 100 configured to perform the PDH technique to stabilize the optical frequency of a laser 102. In the illustrated schematic, a servo 124 is an electronic circuit that stabilizes the optical frequency of the laser 102 to an optical resonance of a reference cavity 112 by nulling an electrical PDH error signal generated by mixer 120.

High stabilities of the laser frequency place demands on the stability of the PDH error signal, requiring shielding of the detection and feedback circuits for the PDH laser frequency stabilization system 100 in order to reduce noise and other environmental influences from outside of the system on detection and demodulation circuits of the system. However, shielding is currently unable to reduce time-varying offsets generated by the various components of the PDH laser frequency stabilization system 100 on itself. The most detrimental interference arises from the electrical pick-up at the PDH modulation frequency. As such, production of high power signals at the PDH frequency should be avoided to mitigate error signal offsets.

BRIEF SUMMARY

Embodiments of the disclosure provide a laser stabilization system including: a laser configured to produce a laser light signal at a target frequency; a phase modulator configured to apply a phase modulation to the laser light signal to produce a phase modulated laser light signal; a stable optical resonator configured to receive the phase modulated laser light signal and return a light signal; a light detection system configured to receive the light signal from the stable optical resonator and produce an amplitude modulated electrical signal based on the light signal; and a digital domain circuit configured to generate a control signal based on the amplitude modulated electrical signal.

Further embodiments of the disclosure provide a digital domain circuit configured to generate a control signal for tuning a laser light output of a laser to a target frequency, the digital domain circuit including: a signal generator that is phase locked to a system clock of the digital domain circuit; an analog-to-digital converter configured to receive an amplitude modulated electrical signal from a light detection system; a digital mixer receiving an output of the analog-to-digital converter and an output signal of a Local Oscillator (LO) of the digital domain circuit; a low pass filter coupled to an output of the digital mixer; a servo controller coupled to the output of the low pass filter; and a digital-to-analog converter between the servo output and the laser.

Even further embodiments of the disclosure provide a control signal generation method performed by a digital domain circuit configured to generate a control signal for tuning a laser light output of a laser to a target frequency. The control signal generation method includes: generating a drive signal for a phase modulator to control a phase modulation applied by the phase modulator to the laser light output; receiving an amplitude modulated electrical signal from a light detection system; analog-to-digital converting the amplitude modulated electrical signal from the light detection system to a digital time series; mixing the digital time series with an output signal of a Local Oscillator (LO) of the digital domain circuit to obtain a demodulated digital time series; low pass filtering the demodulated digital time series to obtain a digital error signal; conditioning the digital error signal by a servo controller to obtain a digital control signal; and digital-to-analog converting the digital control signal to the control signal for tuning the laser light output of the laser to the target frequency.

BRIEF DESCRIPTION OF THE SEVERAL VIEWS OF THE DRAWING(S)

FIG. 7 illustrates the error signal generation method of FIG. 5 including frequency offset locking, in accordance with an embodiment of the disclosure.

DETAILED DESCRIPTION

Figure 1:
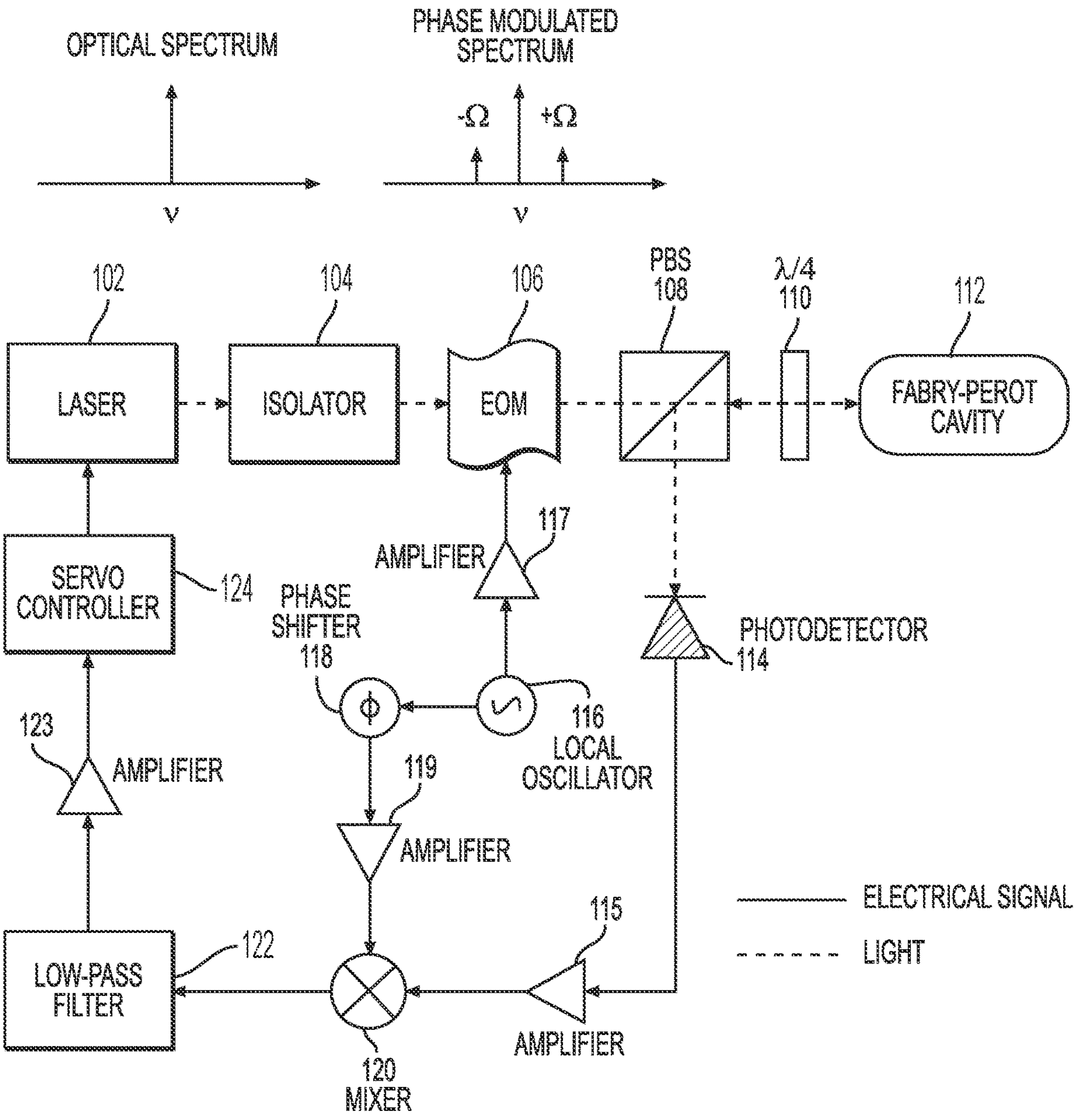
FIG. 1 illustrates a prior art Pound-Drever-Hall (PDH) laser frequency stabilization system.

FIG. 1 illustrates the Pound-Drever-Hall (PDH) laser frequency stabilization system 100 configured to perform a PDH technique to stabilize an optical frequency of a laser 102. As illustrated, the PDH laser frequency stabilization system 100 further includes: an isolator 104, a phase modulator 106, a polarizing beam splitter (PBS) 108, a quarter-wave plate 110, a reference cavity 112, a light detection system 114, an amplifier 115, a Local Oscillator (LO) 116, an amplifier 117, a phase shifter 118, an amplifier 119, a mixer 120, a low pass filter (LPF) 122, an amplifier 123, and an electronic feedback control system 124.

In operation, the laser 102 of the PDH laser frequency stabilization system 100 outputs a light signal at an optical frequency of ν to the phase modulator 106. In embodiments of the disclosure, ν may encompass any range of optical frequency of light. However, in other embodiments, ν may encompass ranges outside the frequency of light. Accordingly, depending on the embodiments of the disclosure, ν can range between 10^6 to 10^15 cycles per second.

In the illustrated embodiment, the laser light signal passes through the isolator 104 before getting to the phase modulator 106. While not necessary for performing the PDH technique, the isolator 104 is provided to prevent light reflecting back into the laser 102 from the remaining sections of the PDH laser frequency stabilization system 100.

In the illustrated embodiment, the phase modulator 106 is in the form of an electro-optic modulator (EOM) 106. The EOM 106 receives a drive signal from the amplifier 117 at frequency Ω from the LO 116 and phase modulates the laser light signal to produce optical sidebands at ν+/−Ω. The phase modulated laser light signal is incident on the reference cavity 112 (i.e., a Fabry-Pérot cavity), where Ω is assumed to be larger than the reference cavity 112 resonance width. When this light is reflected from the Fabry-Pérot cavity 112, the light that coincides with a cavity resonance (carrier or sideband) will undergo a phase shift with respect to those portions that are non-resonant. In this manner, the reflected light is no longer purely phase modulated, but exhibits amplitude modulation at the frequency Ω.

In the illustrated embodiment, the reflected portion of the phase modulated laser light signal that exhibits amplitude modulation at the frequency Ω is sent to the light detection system 114 through the PBS 108 and the quarter-wave plate 110, although other equipment configurations prior to the light detection system 114 are contemplated (i.e., circulator, a beam splitter, etc.). In the illustrated embodiment, the light detection system 114 is a photodetector 114 that detects the amplitude modulation and turns that detected signal into an electrical signal. The electrical signal is then conditioned by the amplifier 115 and synchronously demodulated by the mixer 120 using the LO 116 frequency Ω to obtain a demodulated electrical signal at baseband.

The frequency Ω of the amplitude modulated light is coherent, at the same frequency, and with a fixed phase relationship with the LO 116. Further, a specific phase difference is desired to optimize the error signal to give the maximum sensitivity to the laser's frequency noise. The static configuration of the signal paths may not initially give the required demodulation phase difference. A tunable phase shifter 118 is set to create the required phase relationship by providing its phase shift signal to amplifier 119 for conditioning the signal for the mixer 120.

After demodulation at the mixer 120, the demodulated electrical signal is filtered at the low pass filter 122 to obtain an error signal usable to tune the optical frequency of laser 102. Specifically, the error signal is conditioned by amplifier 123 and provided to the electronic feedback control system 124 that is in turn connected to a frequency control port of the laser 102 such that the electronic feedback control system 124 controls the frequency control port of the laser 102 to tune the optical frequency of the laser 102 based on the error signal. The feedback control system 124 may be a loop filter or Proportional-Integral-Derivative (PID) servo controller, abbreviated as just servo 124.

After demodulation at the mixer 120, the demodulated electrical signal is filtered at the low pass filter 122 to attenuate components in the demodulated signal higher than the feedback bandwidth. In particular, the second harmonic of the modulation frequency, a byproduct of the mixing process, is strongly filtered, as its presence can lead to offsets at the input of any amplifier or subsequent circuit or signal processing chain exhibiting nonlinearities. This signal, as presented to the input of the control system, is referred to as the error signal. In an ideal state, the error signal is a voltage that is strictly proportional to the instantaneous frequency difference between the laser and the cavity resonance center frequency.

Figure 2:
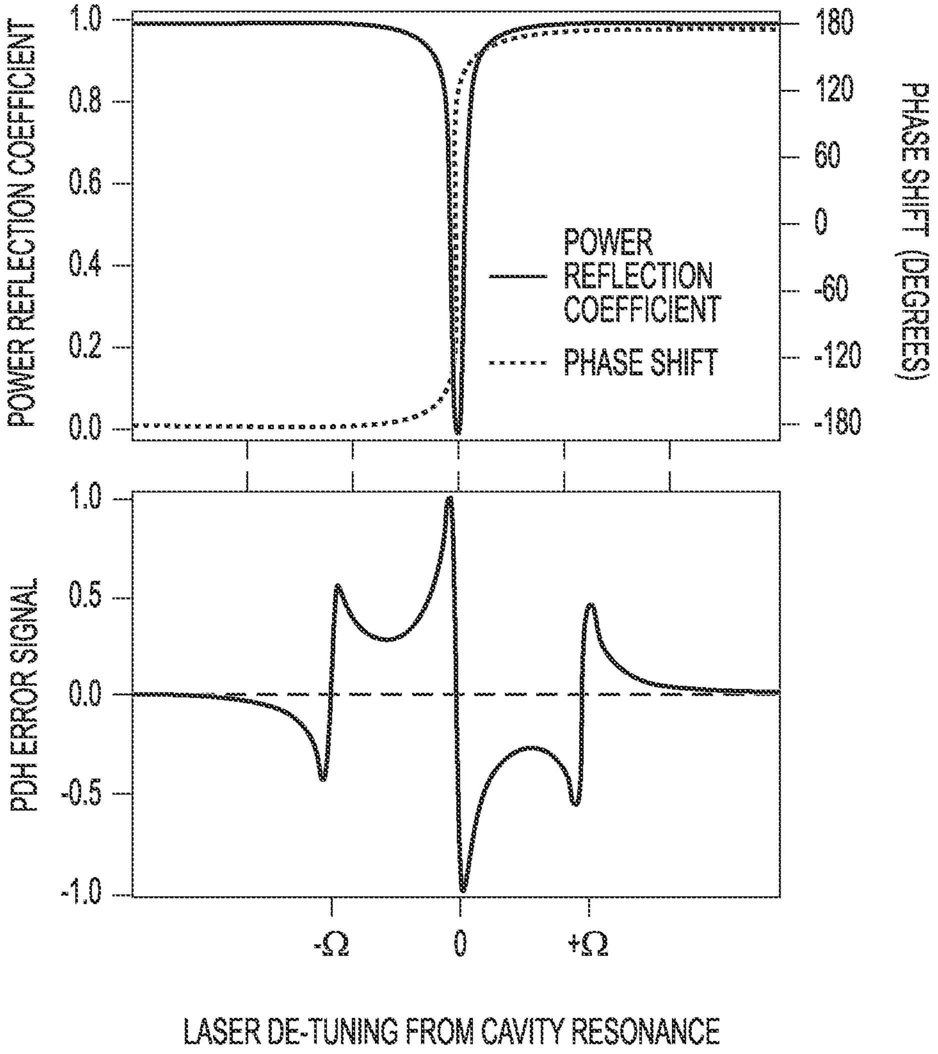
FIG. 2 illustrates a power reflection coefficient and PDH error signal from a PDH frequency stabilization system, in accordance with an embodiment of the disclosure.

FIG. 2 illustrates an optical cavity's power reflection coefficient in the top chart and the error signal in the bottom chart, both of which are plotted over frequency. In the top chart, the power reflection coefficient plots reflected power in the solid line and a phase shift in the dashed line. As shown, at resonance (0 on the horizontal axis), the reflection coefficient goes from 1 (meaning total reflection) to zero and the phase shifts from −180 degrees to 180 degrees. This coincides with the bottom chart illustrating the error signal in that near resonance the error signal changes sign. The servo 124 functions by tuning the frequency control port of the laser 102 in a manner to drive the error signal to zero, which means the laser is stabilized to the center of the reference cavity 112 resonance.

Given the manner in which the servo 124 drives the error signal to zero, any time varying non-ideality in the PDH detection and demodulation portions of system 100 that leads to a bias in the error signal will directly affect the stability of the laser 102 with respect to the cavity 112 resonance. Further, as discussed above, shielding protects from biases arising from sources outside of the PDH laser frequency stabilization system 100, but the system 100 is still susceptible to various sources of internal noise from within the system 100.

Figure 3:
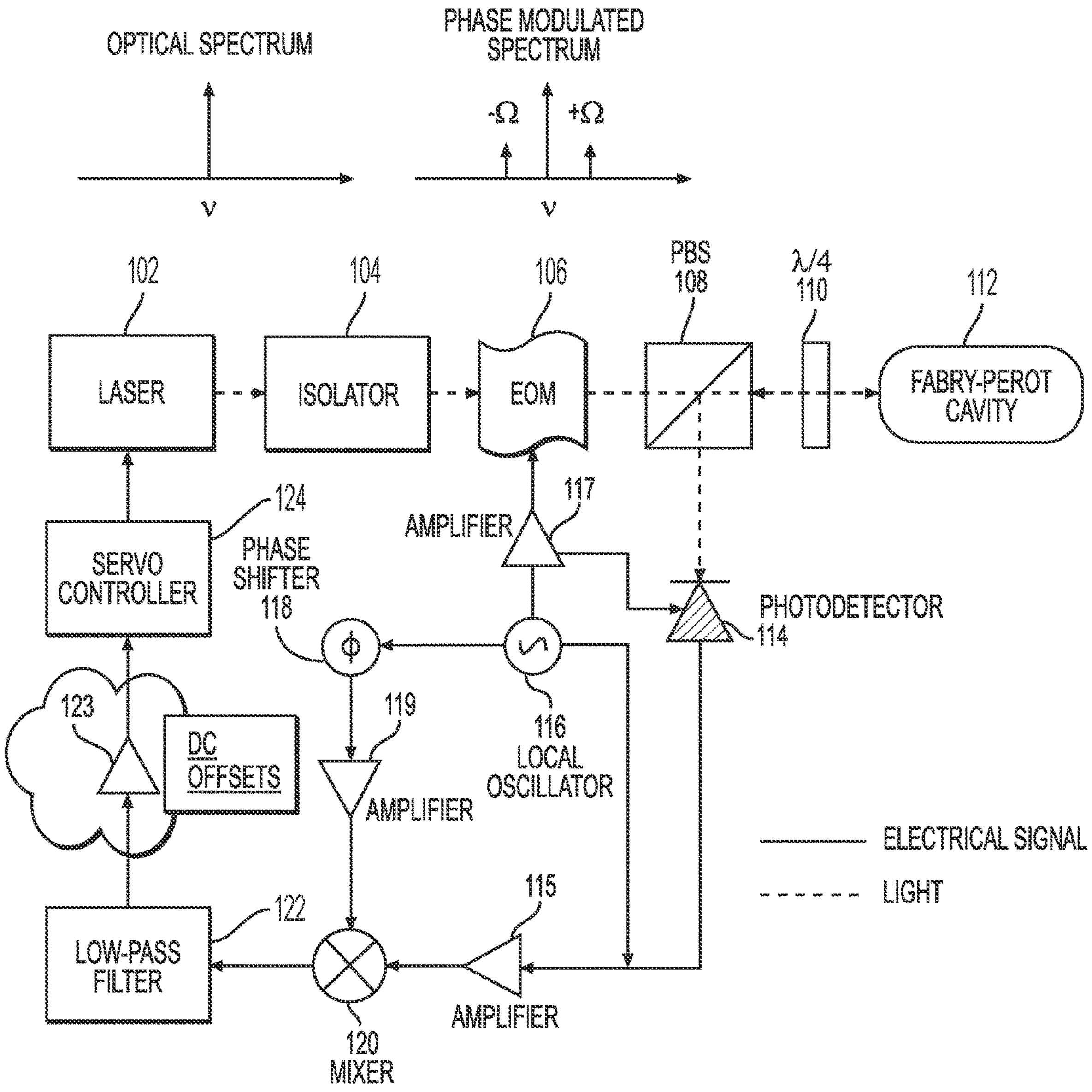
FIG. 3 illustrates internal sources of bias for a PDH error signal, in accordance with an embodiment of the disclosure.

FIG. 3 illustrates problematic sources of bias caused by components of the PDH laser frequency stabilization system 100. For instance, the EOM 106 usually requires a Radio Frequency (RF) power amplifier (not illustrated) to produce the required phase modulation depth. The RF amplifier is prone to radiate a signal at frequency Ω. This radiated signal can couple into the photodetector 114, its cabling, and/or a high gain amplifier driving a signal into the photodetector 114. Such a spurious bias signal is indistinguishable from the photodetected signal at frequency Ω. When demodulated, this spurious signal can produce an uncontrolled, time varying bias of the error signal.

Additionally, the LO 116 may also require an RF power amplifier (not illustrated) in order to drive the LO port of the mixer 116 with sufficient power. The output of this RF power amplifier may couple into the RF input side of the mixer 120. After demodulation, the resulting bias is indistinguishable from the true error signal. Any time-varying fluctuation in this coupling leads to decreased laser stability.

Further, both the low pass filter 122 and the servo 124 may require pre-amplifiers (not illustrated), which are also potential sources of time varying bias. Any drift in an amplifier's DC offset is indistinguishable from the true error signal and leads to degraded laser stability.

Moreover, the analog mixer 120 introduces certain non-idealities when demodulating the RF in with the LO 116. These non-idealities are caused by the multiplication being performed in analog form, which is susceptible to changes in the environment such as the device temperature and other factors that cause drift in the output of the mixer 120.

Some of the potential sources of bias described above can be eliminated using digital demodulation. digital mixers, amplifiers, and integrators are free from time-varying DC offsets, and spurious interference.

Figure 4:
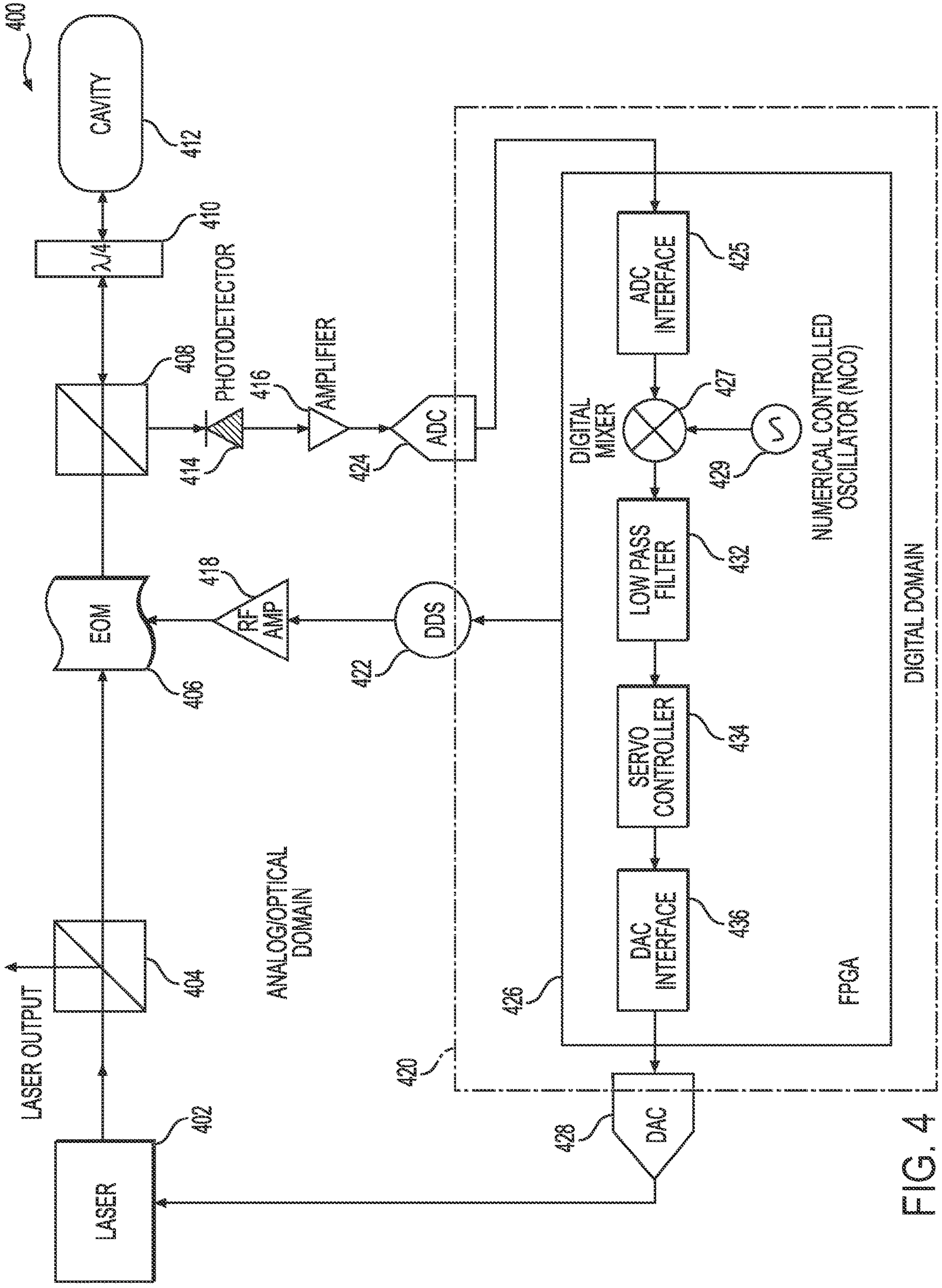
FIG. 4 illustrates a PDH laser frequency stabilization system, in accordance with an embodiment of the disclosure.

FIG. 4 illustrates a PDH laser frequency stabilization system 400 that performs a digital demodulation method. The PDH laser frequency stabilization system 400 is similar to the PDH laser frequency stabilization system 100 except it replaces many of the above described analog components with digital components thereby removing sources of bias and being free from time-varying DC offsets, and spurious interference.

In the illustrated embodiment, the PDH laser frequency stabilization system 400 includes a laser 402, a coupler 404, a phase modulator 406, a second PBS 408, a quarter-wave plate 410, a reference cavity 412, a light detection system 414, an amplifier 416, an RF amplifier 418, and a digital domain circuit 420, where the digital domain circuit 420 encompasses a signal generator 422, an Analog-to-Digital Converter (ADC) 424, a digital demodulation circuit 426, and a Digital-to-Analog Converter (DAC) 428. In the illustrated embodiment, the digital demodulation circuit 426 includes an ADC interface 425, a digital mixer 427, a Numerically Controlled Oscillator (NCO) 429, a low pass filter 432, a servo controller 434, and a DAC interface 436.

In operation, the laser 402 of the PDH laser frequency stabilization system 400 outputs a light signal at an optical frequency of ν through coupler 404 to the phase modulator 406. In the illustrated embodiment, the phase modulator 406 is in the form of an EOM 406. The EOM 406 receives a drive signal at frequency Ω from the signal generator 422 that is amplified by the RF amplifier 418. In the illustrated embodiment, the signal generator 422 is a Direct Digital Synthesizer (DDS) 422 that is phase locked to a system clock of the digital demodulation circuit 426. The EOM 406 phase modulates the laser light signal at frequency Ω to produce optical sidebands at ν+/−Ω. The phase modulated laser light signal is incident on the reference cavity 412 (i.e., a Fabry-Pérot cavity). When this light is reflected from the Fabry-Pérot cavity 412, the light that coincides with a cavity resonance (carrier or sideband) will undergo a phase shift with respect to those portions that are non-resonant. In this manner, the reflected light is no longer purely phase modulated, but exhibits amplitude modulation at the frequency Ω.

The reflected portion of the phase modulated laser light signal that exhibits amplitude modulation at the frequency Ω is sent to the light detection system 414. In the illustrated embodiment, this is sent through the PBS 408 and the quarter-wave plate 410; however, it is contemplated that one of ordinary skill would understand that other such equipment configurations may replace or alter the PBS 408 and the quarter-wave plate 410 (i.e., a circulator, a beam splitter, etc.). In the illustrated embodiment, the light detection system 414 is a photodetector 414 that detects the amplitude modulation and turns that detected signal into an amplitude modulated electrical signal. The amplitude modulated electrical signal is amplified by the amplifier 416 and provided to the ADC 424 to convert the signal to a digital time series and input into the digital domain 420 by the ADC interface 425.

The digital time series is provided to the digital demodulation circuit 426 to perform synchronous demodulation of the digital time series. In the illustrated embodiment, the digital demodulation circuit 426 is a Field Programmable Gate Array (FPGA) 426. Other embodiments are contemplated where the digital demodulation circuit 426 may be implemented with an Application Specific Integrated Circuit (ASIC), a microprocessor, a Digital Signal Processor (DSP), and the like.

The FPGA 426 is configured to provide components for synchronously demodulating the digital time series from the ADC 424. For instance, the FPGA 426 includes the ADC interface 425 and implements a digital mixer 427, where the LO for the digital mixer to demodulate the digital time series is the NCO 429 implemented on the FPGA 426. This NCO 429 is also phase locked to the system clock of the FPGA 426 (i.e., the system clock of the digital demodulation circuit 426). The output of the digital mixer 427 provides a demodulated digital time series that is then filtered by a low pass filter 432 implemented on the FPGA 426 to obtain a digital error signal. In certain embodiments, the low pass filter 432 is a digital Infinite Impulse Response (IIR) filter; however, in other embodiments, the low pass filter 432 could be implemented as a Finite Impulse Response (FIR) filter.

The digital error signal is provided to a PID servo controller 434 to create a drive signal for the frequency control port of the laser to stabilize the frequency of the laser light signal of the laser 402. In the PDH laser frequency stabilization system 400, the PID controller is implemented digitally within the FPGA 426. The PID controller output is provided to the DAC interface 436 and converted to a correction signal by the DAC 428 and applied to the frequency control port of the laser 402, or any other frequency control device/mechanism in the system 400. In this manner, the frequency of the laser light signal produced by laser 402 is stabilized.

As an aside, while the above discussion regarding the PDH laser frequency stabilization system 400 only references one PID controller, embodiments of the disclosure with more than one PID controller are contemplated. For instance, any number of PID controllers may be implemented in the FPGA 426. The PID controllers could be configured to actuate on multiple actuators (e.g., fast and slow). Further, configuration of the PID controllers in the FPGA 426 may be in parallel or series as needed by the requirements of the PDH laser frequency stabilization system 400.

Additionally, in certain embodiments, the frequency control port of laser 402 may be a digital port. For instance, the digital port could receive a digital control signal for the laser 402. In embodiments where the control port of the laser 402 is a digital port, the port configuration may be a serial port, an ethernet port, or the like.

Figure 5:
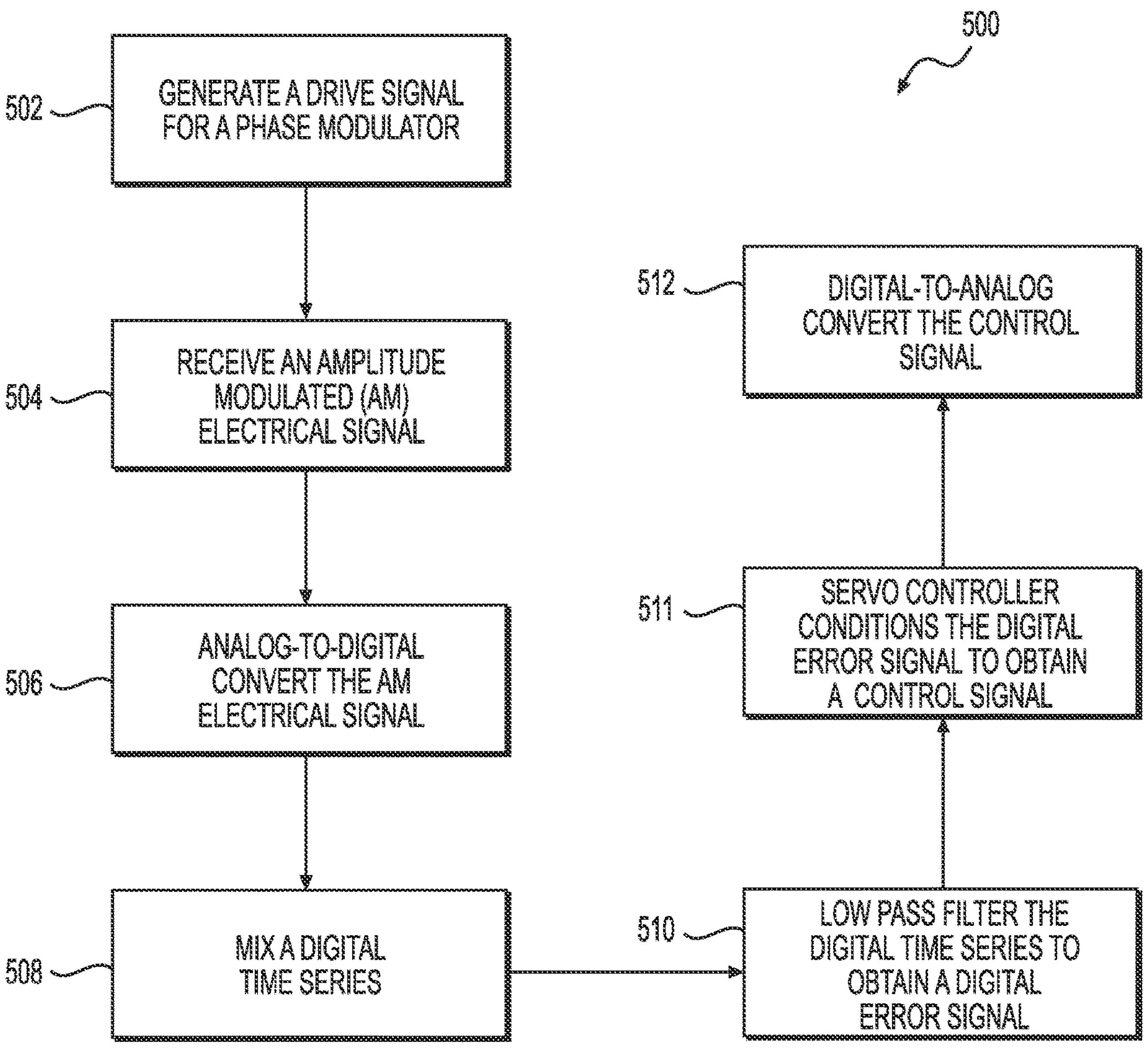
FIG. 5 illustrates an error signal generation method, in accordance with an embodiment of the disclosure.

FIG. 5 illustrates an error signal generation method 500. In certain embodiments, the error signal generation method 500 is performed by the PDH laser frequency stabilization system 400 (see FIG. 4). The error signal generation method 500 includes generating a drive signal for the phase modulator at step 502. In certain embodiments, the phase modulator is the EOM 406, and the drive signal is generated by the DDS 422 phase locked to the system clock of the FPGA 426. The drive signal controls the phase modulation applied by the EOM 406 to the laser light signal from laser 402.

At step 504, an electrical signal at frequency Ω is received from the light detection system 414 (see FIG. 4). In certain embodiments, the light detection system 414 is a photodetector 414 that converts the laser light signal that exhibits amplitude modulation at the frequency Ω into the electrical signal at frequency Ω.

At step 506, the amplitude modulated electrical signal is converted to a digital time series by the ADC 424 (see FIG. 4). At step 508, the digital time series is provided to the digital mixer 427 of FPGA 426 to be demodulated by multiplication with the LO time-series produced by the NCO 429 of the FPGA 426, which is phase locked with the system clock of the FPGA 426. The digital mixer 427 produces a demodulated digital time series.

At step 510, low pass filtering is performed on the demodulated digital time series via low pass filter 432 to obtain the digital error signal. At step 511, the digital error signal is then converted to the correction drive signal by the servo controller 434 conditioning the digital error signal. At step 512, the correction signal is applied to the DAC 428 (see FIG. 4), which physically realizes the correction signal used to drive the frequency control port of the laser 402. Any number of loop filters can be implemented to drive any number of frequency actuators via their respective DACs.

The PDH laser frequency stabilization system 400 and error signal generation method 500 eliminate biases in the error signal due to coupling of the LO to the mixer stage at the photodetector input, as described above in relation to FIG. 3. However, they do not address potential interference from the RF amplifier 418 or the EOM 406. For instance, in the illustrated embodiment of FIG. 4, the LO frequency Ω is still realized by the DDS 422. The RF amplifier 418 and the EOM 406 will pose a threat to the integrity of the error signal through radiated and conducted bias signals at Ω. These biases can be eliminated using frequency offset locking.

Figure 6:
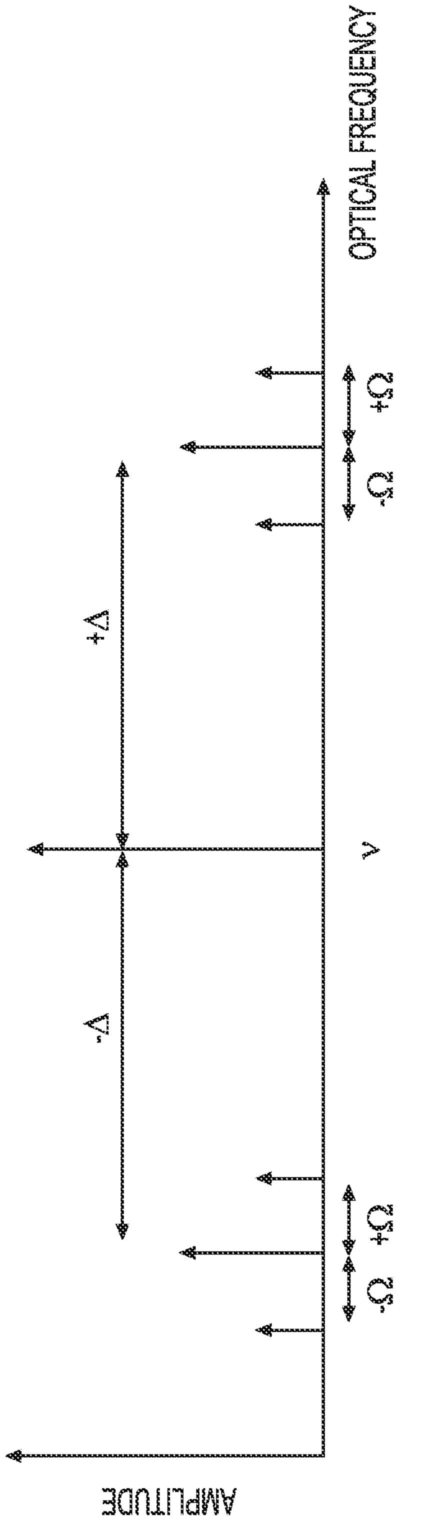
FIG. 6 illustrates a frequency offset locking optical spectrum, in accordance with an embodiment of the disclosure.

For frequency offset locking, rather than generating a pure tone at modulation frequency Ω, the DDS 422 produces a carrier at a frequency Δ that is phase modulated at frequency Ω. FIG. 6 illustrates an optical frequency spectrum when such a signal from the DDS 422 is applied to the EOM 406.

FIG. 6 shows a shifted version of the traditional PDH optical spectrum. The traditional PDH spectrum is shifted both above and below the laser frequency ν by the offset frequency Δ. As a result, the error signal will also be shifted, with zero crossings at ν+/−Δ. This permits stabilizing the laser frequency at an offset A either above or below the cavity 412 resonance.

Generation of the sidebands at plus/minus Ω allows for the potential to detect signal components showing up in the reflection from the reference cavity 412 as amplitude modulation at the photodetector 416. The corresponding electrical signal at Ω generated by the photodetector 416 is digitized and is numerically demodulated to derive the error signal used by the FPGA 426 in the same manner described above. In this manner, bias introduced by spurious interference from the RF amplifier 418 and the EOM 406 and their subsequent demodulation can be virtually eliminated. Frequency offset locking enables the PDH modulation frequency Ω to never be physically realized in a form that can lead to bias in the error signal.

FIG. 7 illustrates a method 700 of performing frequency offset locking. Method 700 includes a step 702 where a carrier signal is generated by the signal generator 422 (i.e., DDS 422). The carrier signal is generated at a first frequency, for instance a frequency Δ. At step 704, the carrier signal is phase modulated at a second frequency, for instance a frequency Ω, to create a modulated carrier. At step 706, the modulated carrier is provided as the drive signal to the optical phase modulator 406 (i.e., EOM 406). In this manner, if signal components of the phase modulation at Ω appear in reflection from the reference cavity 412 (see FIG. 4), then they can be detected as amplitude modulation at the photodetector 414 and compensated for by the FPGA 426 in the manner described above in relation to FIGS. 4 and 5. The remaining steps 708-718 are performed similarly as corresponding steps 504-512 described above from FIG. 5. Because the description is similar, description of steps 708-718 will not be repeated here for the sake of brevity.

Offset locking allows the user to obtain a laser which is as stable as the cavity but at a selectable frequency. This selectable frequency may be selected for the laser to interact with a desired atomic or molecular frequency or another laser.

In addition to the above described benefits, frequency offset locking also enables cancellation of long term physical drift in the cavity 412 (see FIG. 4) resonance. By configuring the signal generator 422 (i.e., DDS 422) to generate a linear frequency ramp (i.e., ω(t)=−Dt) in addition to the above described modulation, the drift in cavity 412 resonance can be suppressed.

Since the amplitude of the sidebands at ν+/−Δ (see FIG. 6) depend on a phase modulation index, the optical power circulating within the reference cavity 412 (i.e., a Fabry-Pérot cavity 412) can be stabilized by monitoring the light transmitted through the cavity and controlling the modulation index as needed. In a particular embodiment, this control could be achieved via further PID control performed by the FPGA 426. In this manner, improved frequency stability by reducing radiation pressure fluctuations within the reference cavity 412 is achieved.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms “a”, “an”, and “the” include plural reference unless the context clearly dictates otherwise. Thus, for example, reference to “a cell” includes a plurality of such cells and equivalents thereof known to those skilled in the art. As well, the terms “a” (or “an”), “one or more” and “at least one” can be used interchangeably herein. It is also to be noted that the terms “comprising”, “including”, and “having” can be used interchangeably. The expression “of any of claims XX-YY” (wherein XX and YY refer to claim numbers) is intended to provide a multiple dependent claim in the alternative form, and in some embodiments is interchangeable with the expression “as in any one of claims XX-YY.”

The use of the terms “a” and “an” and “the” and “at least one” and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Every device, system, formulation, combination of components, or method described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

The invention claimed is:

1. A laser stabilization system, comprising:

a laser configured to produce a laser light signal at a target frequency;

a phase modulator configured to apply a phase modulation to the laser light signal to produce a phase modulated laser light signal;

a stable optical resonator configured to receive the phase modulated laser light signal and return a light signal;

a light detection system configured to receive the light signal from the stable optical resonator and produce an amplitude modulated electrical signal based on the light signal; and a digital domain circuit configured to generate a control signal based on the amplitude modulated electrical signal, wherein the digital domain circuit comprises:

a signal generator that is phase locked to a system clock of the digital domain circuit;

an analog-to-digital converter between the light detection system and the digital demodulation system;

a digital mixer receiving an output of the analog-to-digital converter and an output signal of a Local Oscillator (LO) of the digital domain circuit;

a low pass filter coupled to an output of the digital mixer;

a servo controller coupled to the output of the low pass filter; and a digital-to-analog converter between an output of the servo controller and the laser;

wherein the digital domain circuit is configured to perform a control signal generation method comprising:

generating, by the signal generator, a drive signal for the phase modulator to control the phase modulation applied by the phase modulator to the laser light signal, wherein the generating the drive signal for the phase modulator comprises:

generating, by the signal generator, a carrier signal at a first frequency:

phase modulating the carrier signal at a second frequency to produce a modulated carrier signal; and providing the modulated carrier signal as the drive signal for the phase modulator:

converting, by the analog-to-digital converter, the amplitude modulated electrical signal from the light detection system to a digital time series, mixing, by the digital mixer, the digital time series with the output signal of the LO to obtain a demodulated digital time series;

filtering, by the low pass filter, the demodulated digital time series to obtain a digital error signal;

conditioning the digital error signal by the servo controller to obtain a digital control signal; and converting, by the digital-to-analog converter, the digital control signal to the control signal for controlling the laser to produce the laser light signal at the target frequency.

2. The laser stabilization system of claim 1, wherein the signal generator is a Direct Digital Synthesizer (DDS).

3. The laser stabilization system of claim 1, wherein the digital domain circuit further comprises a numerically controlled oscillator (NCO) configured to provide the output signal of the LO of the digital domain circuit.

4. The laser stabilization system of claim 3, wherein the output signal of the LO of the digital domain circuit is a time-series signal.

5. The laser stabilization system of claim 1, wherein the digital domain circuit is implemented on a single integrated circuit chip.

6. The laser stabilization system of claim 1, wherein the digital domain circuit is a Field Programmable Gate Array (FPGA).

7. The laser stabilization system of claim 1, wherein the phase modulator is an Electro-Optic Phase Modulator (EOM).

8. A digital domain circuit configured to generate a control signal for tuning a laser light output frequency of a laser to a target frequency, the digital domain circuit comprising:

a signal generator that is phase locked to a system clock of the digital domain circuit wherein the signal generator is configured to:

generate a carrier signal at a first frequency;

phase modulate the carrier signal at a second frequency to produce a modulated carrier signal; and provide the modulated carrier signal as the drive signal for a phase modulator configured to control a phase modulation applied by the phase modulator to a laser light output of the laser;

an analog-to-digital converter configured to receive an electrical signal from a light detection system;

a digital mixer receiving an output of the analog-to-digital converter and an output signal of a Local Oscillator (LO) of the digital domain circuit;

a low pass filter coupled to an output of the digital mixer;

a servo controller coupled to the output of the low pass filter; and a digital-to-analog converter between an output of the low pass filter and the laser.

9. The digital domain circuit of claim 8, wherein the digital domain circuit is configured to perform an error signal generation method comprising:

converting, by the analog-to-digital converter, the electrical signal from the light detection system to a digital time series;

mixing, by the digital mixer, the digital time series with the output signal of the LO to obtain a demodulated digital time series;

filtering, by the low pass filter, the demodulated digital time series to obtain a digital error signal;

conditioning the digital error signal by the servo controller to obtain a digital control signal; and converting, by the digital-to-analog converter, the digital control signal to the control signal for controlling the laser to produce the laser light signal at the target frequency.

10. The digital domain circuit of claim 8, wherein the signal generator is a Direct Digital Synthesizer (DDS).

11. The digital domain circuit of claim 8, further comprising a numerically controlled oscillator (NCO) configured to provide the output signal of the LO of the digital domain circuit as a time series signal.

12. The digital domain circuit of claim 8, wherein the digital domain circuit is implemented on a single integrated circuit chip.

13. The digital domain circuit of claim 8, wherein the digital domain circuit is a Field Programmable Gate Array (FPGA).

14. A control signal generation method performed by a digital domain circuit configured to generate a control signal for tuning a laser light output of a laser to a target frequency, the control signal generation method comprising:

generating a drive signal for a phase modulator to control a phase modulation applied by the phase modulator to the laser light output, wherein the generating the drive signal for the phase modulator comprises:

generating a carrier signal at a first frequency;

phase modulating the carrier signal at a second frequency to produce a modulated carrier signal; and providing the modulated carrier signal as the drive signal for the phase modulator;

receiving an electrical signal from a light detection system;

analog-to-digital converting the amplitude modulated electrical signal from the light detection system to a digital time series;

mixing the digital time series with an output signal of a Local Oscillator (LO) of the digital domain circuit to obtain a demodulated digital time series;

low pass filtering the demodulated digital time series to obtain a digital error signal;

conditioning the digital error signal by a servo controller to obtain a digital control signal; and digital-to-analog converting the digital control signal to the control signal for tuning the laser light output of the laser to the target frequency wherein the output of the servo controller is provided to the laser via a digital port.

* * * * *